United States Patent

De Sandre et al.

[15] 3,636,523

[45] Jan. 18, 1972

[54] INFORMATION ACCESSING AND TRANSFERENCE IN AN ELECTRONIC DIGITAL COMPUTER

[72] Inventors: Giovanni De Sandre, Milan; Angelo Subrizi, Torino, both of Italy

[73] Assignee: Ing. C. Olivetti & C., S.p.A., Torino, Italy

[22] Filed: Nov. 7, 1969

[21] Appl. No.: 874,898

[30] Foreign Application Priority Data

Nov. 11, 1968 Italy ................................53830 A/68

[52] U.S. Cl. ..........................................................340/172.5

[51] Int. Cl. ........................................G06f 7/22, G06f 9/12

[58] Field of Search .....................235/157; 340/172.5, 174.1

[56] References Cited

UNITED STATES PATENTS

| | | | |
|---|---|---|---|
| 3,214,736 | 10/1965 | Glaser | 340/172.5 |
| 3,226,691 | 12/1965 | Hazard | 340/172.5 |
| 3,239,816 | 3/1966 | Breslin et al. | 340/172.5 |
| 3,292,155 | 12/1966 | Neilson | 340/172.5 |
| 3,356,996 | 12/1967 | Niquette et al. | 340/172.5 |
| 3,425,039 | 1/1969 | Bahrs et al. | 340/172.5 |
| 3,480,917 | 11/1969 | Day | 340/172.5 |

*Primary Examiner*—Gareth D. Shaw
*Assistant Examiner*—Melvin B. Chapnick
*Attorney*—Irons, Birch, Swindler & McKie and Birch, Swindler, McKie and Beckett

[57] ABSTRACT

An electronic computer having an operational memory formed by a delay line and means for interpreting bits stored on the delay line as a plurality of storage registers in which the program instructions are transferred one at a time to an instruction register for execution. The computer includes means responsive to a jump instruction in the instruction register for jumping to a subroutine beginning with a corresponding reference instruction and for converting the jump instruction to the corresponding reference instruction. After executing the subroutine the computer is responsive to an instruction recorded at the end thereof for jumping back to the converted jump instruction and reconverting it to a jump instruction. Also included in the computer are means responsive to a predetermined instruction for interpreting the address portions of following instruction as indirect addresses. A magnetic tape cartridge is used for bulk storage of program and data, and blocks of information may be transferred between the operational memory and the magnetic tape. Locations on the tape cartridge may be addressed directly or indirectly.

11 Claims, 11 Drawing Figures

Fig 1a

INVENTORS
GIOVANNI DE SANDRE
ANGELO SUBRIZI

*INVENTORS*
GIOVANNI DE SANDRE
ANGELO SUBRIZI

*INVENTORS*
GIOVANNI DE SANDRE
ANGELO SUBRIZI

INVENTORS
GIOVANNI DE SANDRE
ANGELO SUBRIZI

INVENTORS
GIOVANNI DE SANDRE
ANGELO SUBRIZI

INFORMATION ACCESSING AND TRANSFERENCE IN AN ELECTRONIC DIGITAL COMPUTER

CROSS-REFERENCE TO RELATED APPLICATION

Applicants claim priority from corresponding Italian Pat. application, Ser. No. 53830–A/68, filed Nov. 11, 1968.

BACKGROUND OF THE INVENTION

1. Field of the Invention

This invention relates to improvements in desk top electronic computers.

2. Description of the Prior Art

Mechanical, and more recently electronic, desk top calculating machines have long been standard equipment in business offices for performing the myriad computational tasks which arise every day. Although these machines offered a great advance over earlier hand methods, many disadvantages still existed. To perform calculations of any complexity they required a skilled operator and large amounts of time. Even a skilled operator had to perform a new type of calculation several times before he could be expected to remember the steps with any degree of accuracy.

Large corporations were able to use large-scale data processing apparatus to perform many of these tasks but this solution was uneconomical for a small business. Also, even in a large corporation, much residual work was left which, for one reason or another, was still performed on calculating machines.

In the last few years there have been introduced calculating-computing machines which solve many of these problems. These machines, such as that described in U.S. Pat. No. 3,304,418 which issued on Feb. 2, 1967 and is assigned to the assignee of the present invention, contain a memory and arithmetic circuitry and may be easily programmed to perform even complex arithmetic tasks. Furthermore, in the machine described in the above-mentioned patent these programs may be individually stored on magnetic cards and the machine may be reprogrammed to perform any desired task by merely dropping a single magnetic card having the selected program stored thereon through a reading slot. Since the only thing the operator has to do is to enter numerical data from time to time from a keyboard, even an unskilled person may use the machine.

As business becomes more complex, however, a need is growing for a machine having greater memory capacity and more flexibility in handling program and data but which is still within the price range of a small business. It is also desirable that the machine be able to receive and transmit information from and to other input/output devices such as tape units, teleprinters or a large-scale computer. These improvements must be made with only a minor increase in size and complexity, and therefore cost, and must not significantly reduce the machine's operating speed.

SUMMARY OF THE INVENTION

According to the invention there is provided in a desk top computer having a delay line memory which functions as a plurality of registers, a magnetic tape cartridge for storing blocks of information, each of said blocks containing an amount of information equal to an integral multiple of the capacity of one of said memory registers and means for selectively transferring said blocks of information between selected groups of said memory registers and said cartridge. Also provided are means responsive to the extraction of a jump instruction from the memory during the step-by-step execution of a program for jumping to a subroutine beginning and ending with a reference instruction corresponding to said jump instruction, said jumping means being operative to convert said jump instruction to the corresponding reference instruction, means for interpreting the reference instruction ending said subroutine as the corresponding jump instruction for jumping back to said converted jump instruction upon the completion of the execution of said subroutine, and means for reconverting said converted jump instruction back to the original jump instruction. The computer of this invention also includes indirect addressing means for decoding and interpreting as an address the numbers stored in a predetermined portion of selected memory registers during the execution of instructions and transfers of information to and from said cartridge.

Various other objects, advantages, and features of the invention will become more fully apparent in the following specification with its appended claims and accompanying drawings in which:

Figure 3:
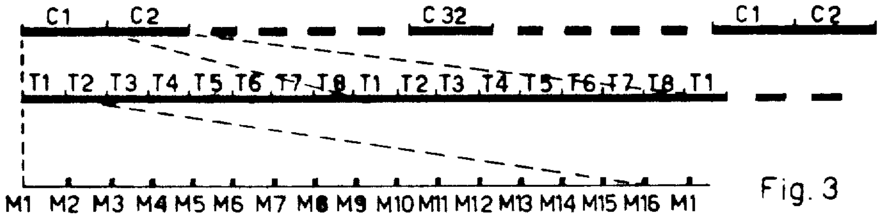
Figure 1:
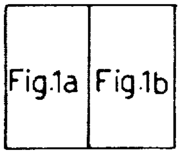
FIG. 1 indicates the manner in which FIGS. *1a* and *1b* are combined.
Figure 2:
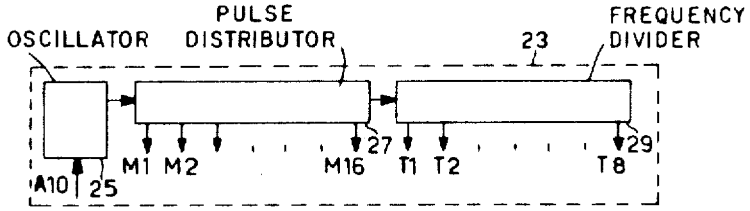
Figure 4:
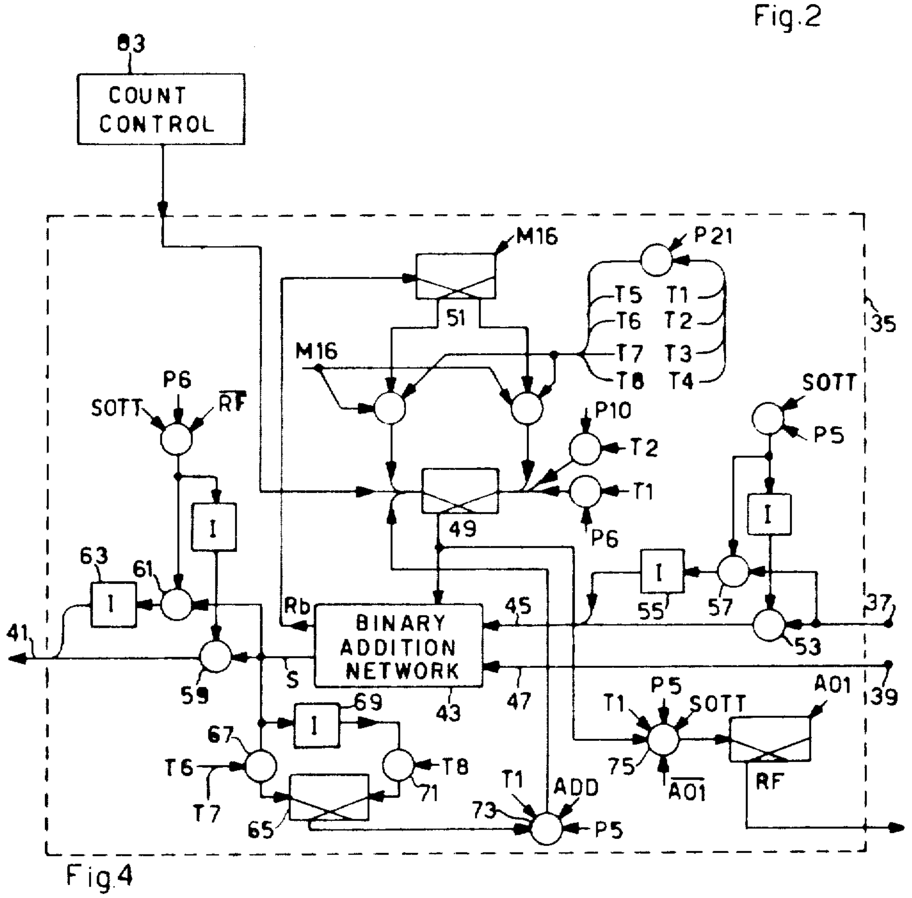
Figure 1A:
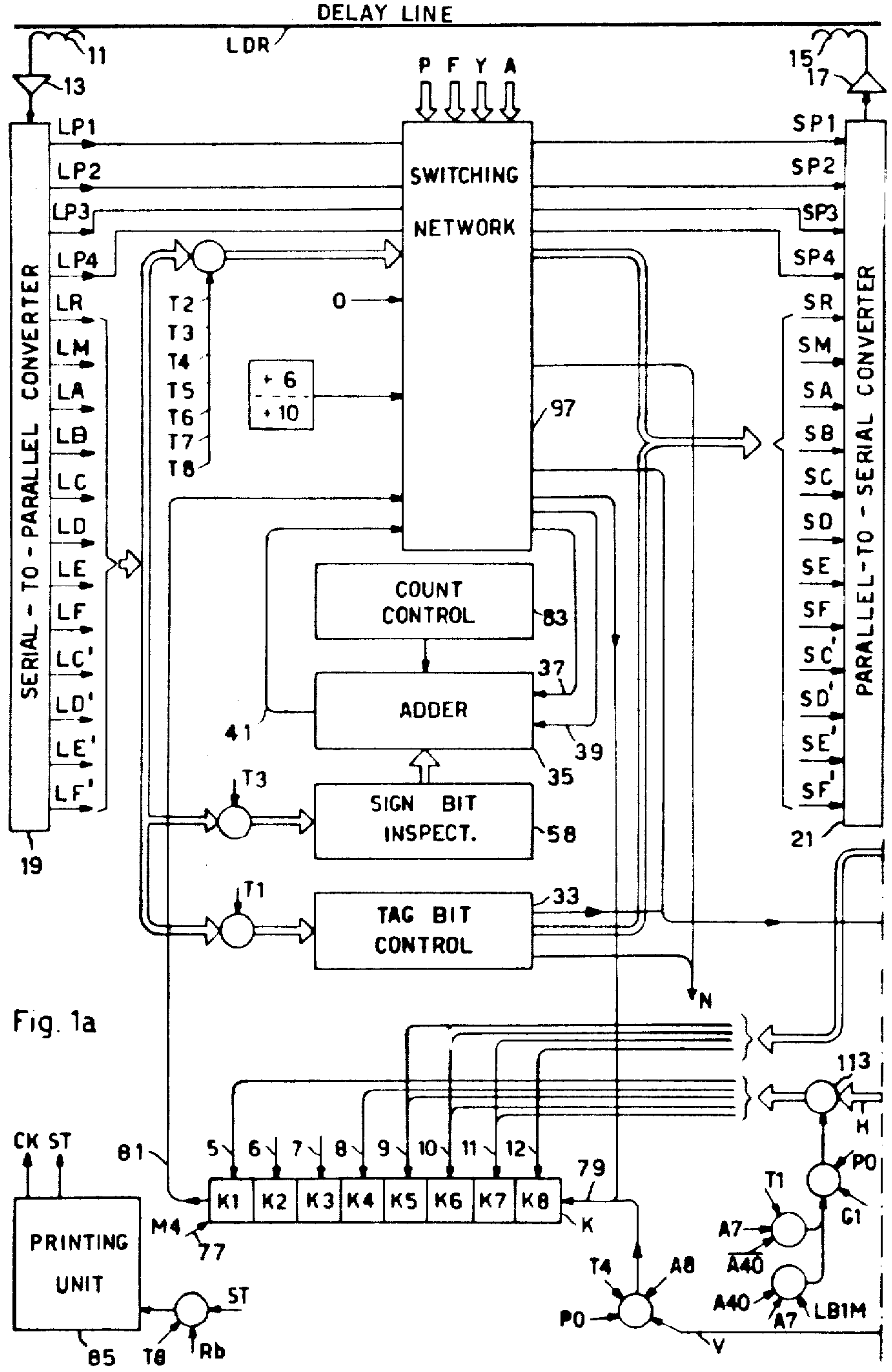
Figure 1B:
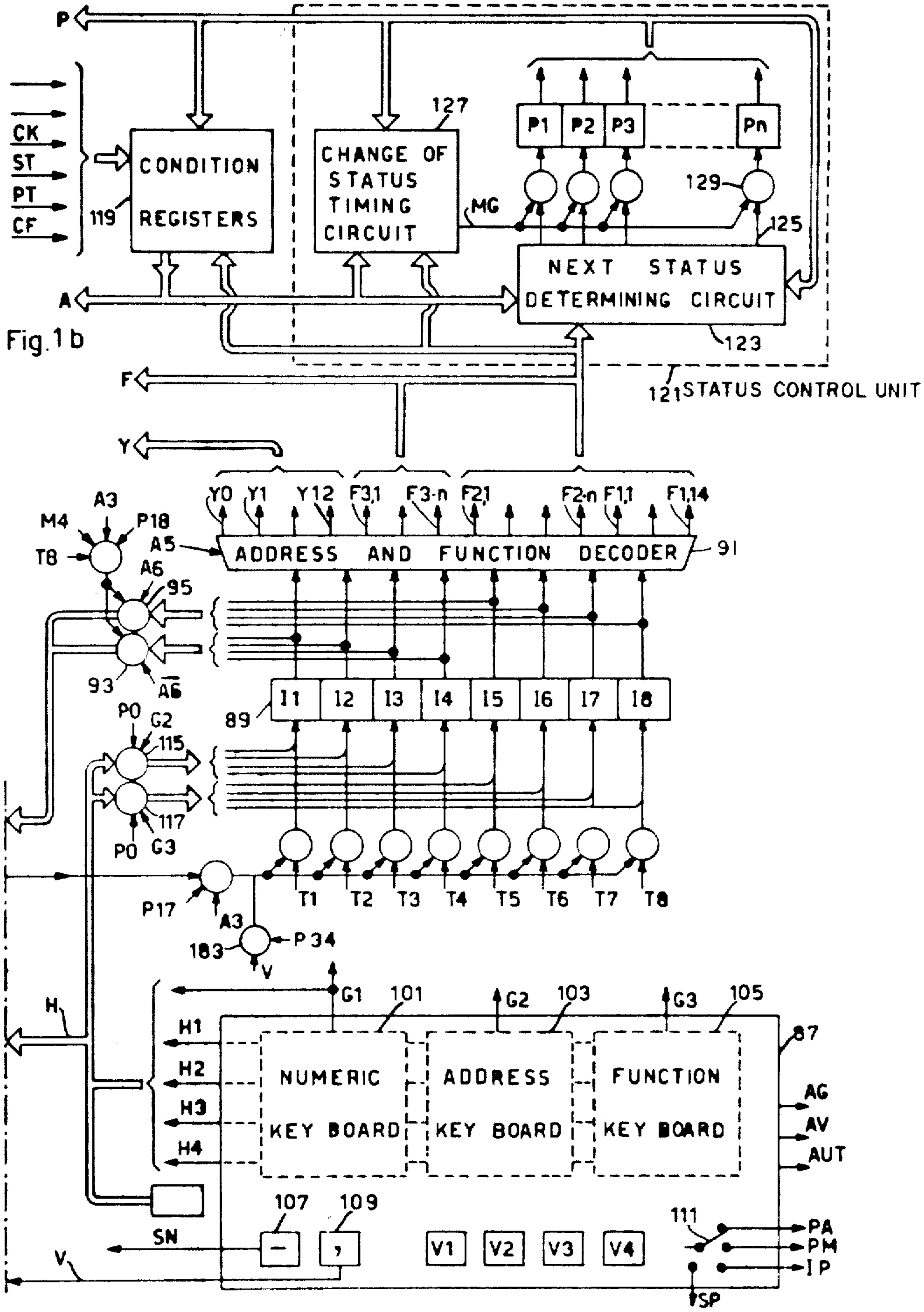
Figure 5:
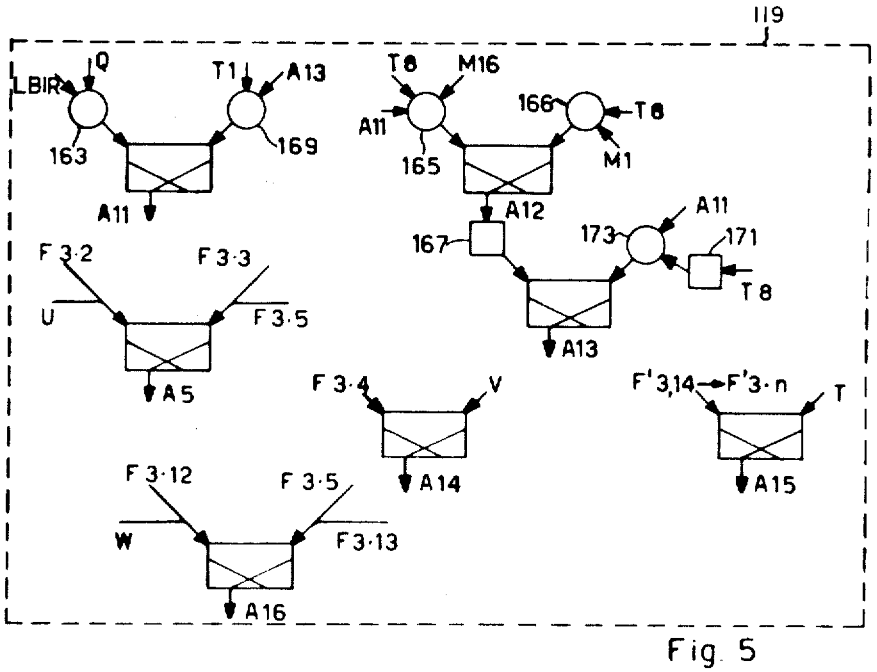
Figure 7:
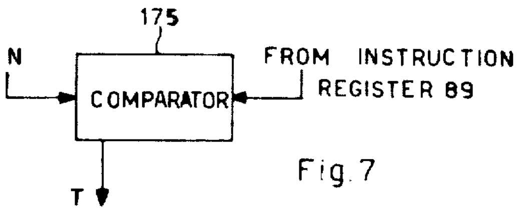
Figure 8:
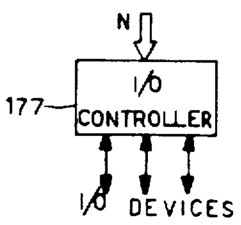
Figure 9:
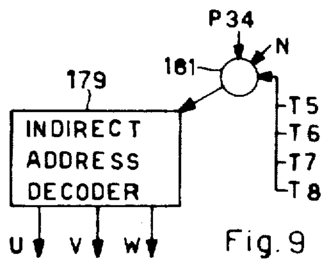
Figure 6:
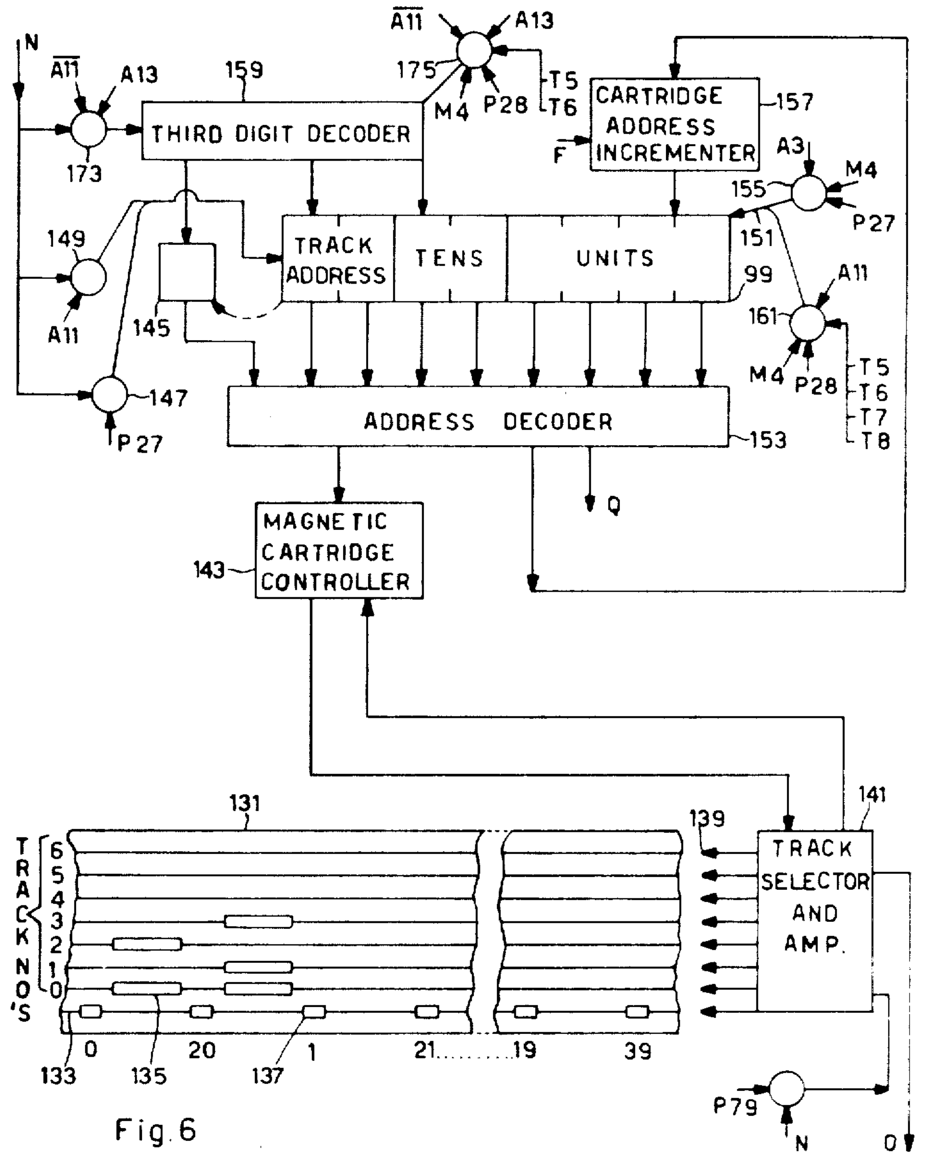

FIGS. *1a* and *1b* are a schematic block diagram of a portion of an embodiment of the computer of the invention;

FIG. 2 is a block diagram of the timing circuitry for the computer illustrated in FIGS. *1a* and *1b*;

FIG. 3 is a diagram of the timing pulses produced by the timing circuitry of FIG. 2;

FIG. 4 is a more detailed schematic block diagram of the Adder shown in FIG. 1;

FIG. 5 is a more detailed schematic diagram of some of the Condition Registers of FIG. 1;

FIG. 6 is a schematic diagram of an embodiment of the magnetic tape cartridge of the invention;

FIG. 7 is a block diagram of the Comparator of the present invention;

FIG. 8 is a block diagram of the Input Output Controller of the present invention;

FIG. 9 is a block diagram of the Indirect Address Decoder.

DETAILED DESCRIPTION OF THE INVENTION

This invention can best be understood from the following detailed description of the illustrated embodiment.

GENERAL DESCRIPTION

Referring to FIG. 1 of the drawings, the computer includes a magnetostrictive delay line memory, LDR, having, for instance, 16 registers, P1, P2, P3, P4, R, M, A, B, C, D, E, F, C', D', E', and D'; recorded thereon. The LDR is provided with a reading transducer 11 feeding a reading amplifier 13 and with a writing transducer 15 fed by a writing amplifier 17.

Each memory register recorded on the LDR may comprise 31 decimal digits, each one made up of eight binary bits, whereby each register may store up to 31 eight-bit characters. Both the characters and the bits are processed in series. Therefore a train of 16.8.31 binary signals recirculates in the delay line LDR.

The 16 first occurring binary signals on the LDR represent the first bit of the first decimal digit of the registers P1, P2, P3, P4, R, M, A, B, C, D, E, F, C', D', E', and F' respectively, and the 16 following binary signals represent the second bit of the first decimal digit of said registers respectively.

Assuming for instance that the binary signals are recorded in the LDR with nonreturn to zero techniques so as to be spaced one-half microsecond from each other, the signals belonging to a certain register are spaced 8 microseconds from each other. Each register comprises a train of 8.31 binary signals spaced 8 microseconds from each other, the signal trains belonging to the several registers being displaced one-half microsecond from each other.

The Reading Amplifier 13 feeds a Serial-to-Parallel Converter 19, which produces over 16 separate outputs lines, LP1, LP2, LP3, LP4, LR, LM, LA, LB, LC, LD, LE, LF, LC', LD', LE' and LF', 16 simultaneous signals representing the 16 bits stored in the same binary place of the same decimal digit of the 16 registers.

Therefore, at a given instant 16 signals representing the first bit of the first decimal digit of the 16 registers are simultaneously present on the 16 output lines; 8 microseconds later, 16 signals representing the second bit of the first decimal digit are present on said output lines, etc.

Each group of 16 signals simultaneously delivered on the output lines of the Converter 19, after being processed, is fed to the Parallel-to-Serial Converter 21. The Converter 21 in turn feeds the writing amplifier 17 with the 16 signals restored to their previous serial order and spaced one-half microsecond from each other. The transducer 15 therefore writes the signals back into the LDR either unchanged or modified by to the operation of the computer, while maintaining their previous relative location. Therefore it is apparent that the single delay line LDR is equivalent, with respect to the external circuits, to a group of 16 delay lines working in parallel, each one containing a single register and provided with an output and an input line.

This interleaved arrangement of the signals in the delay line allows all the registers of the computer to be contained in a single delay line provided with a single reading transducer and a single writing transducer, so that the cost of the memory is substantially the same as that of a delay line containing one register. Moreover, as the pulse repetition frequency in the delay line is 16 times greater than in the other circuits of the computer, it is possible to attain a good utilization of the storage capacity of the delay line while using lower speed circuits in the other parts of the computer.

As the delay line storage is cyclic in nature, the operation of the computer is divided into successive memory cycles, each cycle comprising 32 digit periods C1 to C32 and each digit period being divided into eight bit periods T1 to T8.

Referring to FIG. 2 of the drawings a clock pulse generator 23 produces, on the output lines T1 to T8, successive 8 microsecond clock pulses which indicate corresponding bit periods, as shown in the timing diagram of FIG. 3. The output terminal T1 is energized during the entire first bit period of each one of the 32 digit periods, the output terminal T2 is similarly energized during the entire second bit period of each one of the digit periods, etc.

The clock pulse generator 23 is synchronized with the delay line LDR in such a way that the beginning of the *n*th bit period of the *m*th digit period coincides with the instant in which the 16 binary signals representing the bits read in the *n*th binary bit of the *m*th decimal digit of the 16 memory registers begin to be available on the outputs lines of the Serial-to-Parallel Converter 19. These binary signals are stored in the Converter 19 for the duration of the corresponding bit period. During the same bit period the signals representing the 16 bits produced by processing said 16 bits read out of the delay line LDR are fed to the Parallel-to-Serial Converter 21 and written in the delay line.

The Generator 23 (FIG. 2) also produces, during each bit period, 16 pulses M1 to M16 (FIG. 3). The pulse M1 defines the reading time, that is the instant when the Serial-to-Parallel Converter 19 begins to make available the bits pertaining to the present bit period. The pulse M4 indicates the writing time, that is the instant when the processed bits are fed into the Parallel-to-Serial Converter 21 for writing into the delay line LDR.

The Generator 23 comprises an Oscillator 25 which, when operative, feeds a Pulse Distributor 27 with pulses having the frequency of the pulses M1 to M16. A Frequency Divider 29 fed by the Distributor 27 produces the clock pulses T1 to T8. The Oscillator 25 is operative only as long as a bistable device controlled by signals circulating in the delay line LDR remains set. A more detailed description of the operation of this bistable device may be found in the aforementioned U.S. Pat. No. 3,304,418.

Each decimal digit place of the memory LDR may contain either a decimal digit or an instruction. The registers P1 through P4 may only be used for storing instructions of a program, each register storing up to 31 instructions. Registers C, D, E, F, C', D', E' and F', may each be used for storing up to 31 instructions or up to 30 digits of data, giving the machine a program capacity of 372 instructions. Register B may be used only for storing data. The memory registers are used in the following order for storing program instructions: P1, P2, P3, P4, C', D', E', F', C, D, E, F. Registers M, A and R are operational registers, used to store operands and results of operations.

The program instructions of the present computer may have three formats. The basic format of an instruction is an eight-bit character in which the last four bits represent one of 14 possible function codes, while the first four bits represent the memory register on which the operation is to be performed.

The address portion of the instruction may refer to a field beginning with either the first or the 16th digit of the register depending on whether the register itself or the split portion is addressed, respectively. In this way a register may be divided into two sections and store two independent segments of information. To this first basic format there belong the arithmetic and transfer instructions, the instruction for printing numbers on the internal printer, and some jump instructions in which the address defines a recognition code for the end of the jump.

Some of the more important instructions of the first format are described briefly below, the letter Y indicating the generic register addressed by the instruction:

F1.1. Addition: transfer the number contained in the register Y to the register M, then add the contents of the register M to the contents of the register A and write the result in the register A; that is, in symbolic form: $Y \rightarrow M$, $(A+M) \rightarrow A$;

F1.2. Substraction: similarly $Y \rightarrow M$, $(A-M) \rightarrow A$;

F1.3. Multiplication: similarly $Y \rightarrow M$, $(A \cdot M) \rightarrow A$;

F1.4. Division: similarly $Y \rightarrow M$, $(AM) \rightarrow A$;

F1.5. Transfer from M: transfer the contents of the register M to the register Y, that is in symbolic form $M \rightarrow Y$;

F1.6. Return to A: transfer the contents of the register Y to the register A, that is in symbolic form $Y \rightarrow A$;

F1.7. Exchange: transfer the contents of the register Y to the register A and vice versa, that is in symbolic form $Y \rightarrow$ A:

F1.8. Print register: print the contents of the register Y on the internal printer;

F1.9. Unconditional jump: jump to the instruction recognizable by means of the code Y;

F1.10. Conditional jump: jump to the instruction recognizable by means of the code Y if the contents of the register A are greater than zero.

Instructions of the second format are made up of a pair of digits of eight bits each, B1 through B8, located in a pair of adjacent decimal digit places of the memory.

Among the more important instructions of this format are the following:

F2.1. Modify the first instruction of the program. In this instruction, the first digit defines the function code and the second digit contains eight bits to be inserted into the first decimal digit place of the P1 Register.

Among other uses, this instruction may transfer to the first decimal digit place of P1 Register a jump instruction coded in the eight binary places of the second digit of the instruction. In this use the instruction is essentially a reentry from a subroutine into the main program together with the third format instruction F3.1 which orders an unconditional jump to the first instruction place of the memory;

F2.2. Search for an address on the Magnetic Cartridge.

This instruction is used in transfers of blocks of information between the memory and a Magnetic Tape Cartridge (FIG. 6). The first eight bits contain the function code and the second eight bits contain the address on the Cartridge. The instruction for initiating the transfer is contained later in the program.

F2.3. Input of information from an external source. (e.g., tape reader, teletype, external computer, etc.)

The first digit contains the function code and the second selects and, in part, controls the particular input. The information is read into the M register.

F2.4. Output of information to an external source.

This instruction is somewhat different from the other two digit instructions in that the first four bits, B1 through B4, of the first digit contain the address of the register to be output and the second four bits B5 through B8 contain the function code. The second digit selects the particular output device.

An instruction of the third format is made up of eight bits, B1 through B8, which collectively indicate a function code. Special instructions which control, for example, transfer between prefixed logic means and the computation of percentages belong to the third format. The following are among the most important of this type instruction:

F3.1. Jump to the instruction contained in the first digit place of the P1 Register. This instruction may be used, for instance, in conjunction with the instruction F2.1 hereinbefore described, to reenter the main program after completion of a subroutine.

For a further description of the operation of this type of jump instruction, reference should be made to U.S. Pat. application, No. 717,110, filed Mar. 29, 1968, now abandoned and assigned to the assignee of the present invention.

F3.2. Shift register addresses. This instruction sets the bistable device A5 shown in FIG. 5 which causes the Instruction Decoder 91, to interpret the address portion of first format instructions, or of an output instruction, which address register C, D, E or F as C′, D′, E′, or F′, respectively.

F3.3. Resets the bistable device A5 so that the Instruction Decoder 91 interprets the addresses normally again.

F3.4. Set indirect address bistable device A14. The setting of bistable device A14, shown in FIG. 5 of the drawings causes the machine to interpret the address portion of the following instruction as an indirect address. The actual data that the instruction is to operate upon is located in the address specified in the register addressed by the address portion of the instruction.

F3.5. Resets bistable devices A5 and A16 after an indirect address instruction so that the following instructions are interpreted normally.

F3.6. F.3.8. Transfer of information to Magnetic Tape Cartridge. These are a group of three instructions which first increment the address stored in the Cartridge Address Register 99 (FIG. 6) and then transfer the information stored in one of three groups of four memory registers to the Magnetic Tape Cartridge at the specified address.

F3.9. F3.11. Transfer information from Cartridge. A group of three instructions which first increment the block address specified in the Cartridge Address Register 99 (FIG. 6) and then transfer the information stored in the addressed block to one of three groups of four memory registers.

F3.12. Modification of split. The instruction sets the bistable device A16 (FIG. 5) which causes the computer to interpret the address portion of instructions that follow as addressing a field of a register beginning with the eight or 24th digit place of the register depending on whether the whole register or the split portion (starting with the 16digit place) is addressed, respectively, by the instruction. This instruction allows th each register to be divided into fourths.

F3.13. Reset of split.—Resets bistable device A16 (FIG. 5);

F3.14. F3.*n*. Jump with retention of the starting point. These are a plurality of instructions each corresponding to a different reference instruction. The jump is executed to a subroutine which begins and ends with the corresponding reference instruction. The machine treats the second reference instruction as the corresponding jump instruction and jumps back to the original jump instruction which had been converted to a reference instruction at the time of the original jump.

If the computer of this invention is combined with a typewriter, other instructions of the third format may also be included in the instruction repertoire for controlling its operation. Examples of instructions of this type and a description of the hardware necessary for their execution are also contained in the U.S. application Pat. No. 717,110, now abandoned, mentioned above.

Each decimal digit of data is represented in the computer by means of four bits, B5, B6, B7 and B8, according to a binary-decimal code. In the delay line memory LDR these four bits are recorded in the last occurring four bit places T5, T6, T7, T8 respectively, while the first four bit places are used for storing tag bits. The bit place T4 is used for storing a decimal-point bit B4, which is "0" for all the digits of a decimal number except the first digit after the decimal point. The bit place T3 is used for storing a sign bit B3, which is "0" for all the decimal digits of a positive number and "1" for all the decimal digits of a negative number. The bit place T2 is used for storing a digit-identifying bit B2, which is "1" in each occupied decimal digit place "0" in each unoccupied decimal digit place (nonsignificant zero).

Therefore the complete representation of a decimal digit in the memory LDR requires seven bit places, T2, T3, T4, T5, T6, T7 and T8, of a given decimal digit place. The remaining bit place T1 is used for storing a tag bit B1 whose meaning is not necessarily related to the decimal digit stored in said digit place.

In the following description a bit stored in a binary bit place *a* of a decimal digit place of a register *b* is designated as B*ab*, and the signal obtained when reading the bit out of the LDR is designated LB*ab*.

A bit B1R="1" stored in the first decimal digit place C1, of the register R is used to start the Clock Pulse Generator 23 at the beginning of each memory cycle. A bit B1E="1" stored in the 32nd decimal digit place, C32, of the register E is used to stop the Generator 23. A bit B1B="1" stored in the *n*th decimal place of the register B indicates that, during the execution of a program, the next instruction to be executed is stored in the *n*th decimal place of the particular program register being used. A bit B1M="1" stored in the *n*th decimal place of the register M indicates: when introducing a number from the keyboard into the register M, that the decimal digit next introduced is to be stored in the (*n*—1) th decimal digit place; when introducing an instruction from the keyboard, that the next instruction is to be stored in the *n*th decimal digit place of a memory register; when printing a number stored in any register that the next digit to be printed is the digit stored in the *n*th decimal digit place of said register; when adding two numbers, that the digit of the sum stored in the *n*th decimal digit place of the register A must be thereafter corrected by adding a filler digit thereto. A bit B1A="1" stored in the *n*th decimal place of the register A indicates that the execution of the main body of a program has been interrupted at the *n*th instruction of a memory register for beginning the execution of a subroutine. Therefore the tag bits B1R, B1E are used to represent fixed reference points in the various registers (beginning and end respectively) and the tag bits B1A, B1B and B1M represent movable reference points within the registers. Moreover the bit B1M is used, when performing an addition, to record, for each decimal place, information pertaining to an operation to be performed upon that decimal place.

The regeneration, modification and shifting of said tag bits B1 are performed by a Tag-Bit Control Circuit 33.

The computer also includes an Adder 35 having a pair of input lines 37 and 39 for concurrently receiving two bits to be added. A sum bit is produced on the output line 41. In the embodiment shown in FIG. 4, the Adder 35 includes a binary addition network 43 which provides on the output lines S and R*b* the binary sum and the binary carry, respectively. These outputs are produced by summing the two bits concurrently fed to the input lines 45 and 47 and the binary carry bit resulting from the addition of the preceding pair of bits. This carry bit is stored in a bistable circuit 49.

The signals representing the two bits to be added are present at the input form the time M1 to the time M16 of the corresponding bit period, and the signals representing the sum bits S and the carry bit R*b* are present at the output substantially simultaneously. The previous carry bit is stored in the bistable circuit 49 from the pulse M16 of the preceding bit period until the pulse M16 of the present bit period.

The new carry bit R*b* is transferred to a bistable circuit 51, where it is stored until the pulse M16 causes it to be transferred into the bistable circuit 49, where it is stored during the entire next bit period for being fed to the addition network 43 during the addition of the next pair of bits.

The input lines 37 of the adder may be connected to the input line 45 of the addition network 43 either directly via a gate 53 or through an inverter 55 via a gate 57. In the first case each decimal digit is introduced without modification into the addition network 43, and in the second case the ones complement of the digit is introduced.

The output line S of the addition network 43 may be connected to the output line 41 of the Adder 35 either directly via a gate 59 or via a gate 61 and an inverter 63. Thus either the digits or their ones complement may be output.

A bistable device 65 is set through a gate 67 by every bit equal to "1" appearing on the output line S of a the addition network 43 during the bit periods T6 and T7, and is reset through an inverter 69 and a gate 71 by every bit equal to "0" appearing on said output line S during the bit period T8.

Therefore, if the bistable device 65 is set after the last bit period T8 of the addition of a pair of decimal digits, the sum digit is greater than nine and less than 16, so that a decimal carry must be transmitted to the following decimal place. The gate 73 transmits the output of the bistable device 65 to the bistable device 49, which enters the decimal carry into the addition network 43 in the following digit period $C(n+1)$. A decimal carry must also be transmitted if a binary carry R*b* 8 is produced by summing the two most significant bits, B8. This binary carry indicates that the sum digit is greater than 15. The decimal carry is transmitted in this case by the bistable devices 51 and 49 in the same manner as was described above. If a carry is generated out of any decimal digit the sum digit is not correct and must be corrected by the addition of a correction digit. This may be accomplished in the manner described in the aforementioned U.S. Pat. No. 3,304,418.

If a decimal carry is generated in the last (most significant) decimal digit of the two numbers being added, then the decimal carry is stored in a bistable device RF through a gate 75. Therefore the bistable device RF, when energized, indicates that there exists an end carry resulting from the addition of the two most significant decimal digits.

Referring again to FIG. 1, the computer is provided with a shift register K comprising eight binary stages K1 to K8. Upon receiving a shift pulse over a terminal 77, the bits stored in the stages K2 to K8 are shifted into the stages K1 to K7 respectively, or, if bits are then present on the input lines 5, 6, 7, 8, 9, 10, 11 and 12, they are transferred into the stages K1, K2, K3, K4, K5, K6, K7 and K8, respectively.

The pulses M4 produced by the Pulse Distributor 27 (FIG. 2) are used as shift pulses for the register K, which therefore receives one shift pulse during each bit period, or eight shift pulses during each digit period. The contents of each stage of the register K remains unchanged from the pulse M4 of each bit period until the pulse M4 of the following bit period. A bit fed to the input line 79 of the register K during a particular bit period is available on the output line 81 of the register K eight bit periods, or one digit period, later. Therefore, the register K can act as a section of delay line having a length corresponding to one digit period.

By connecting a memory register and the shift register K in a closed loop while leaving all the remaining registers with their outputs directly connected to their respective inputs, the selected register is effectively lengthened one digit period with respect to the remaining registers. Therefore during each memory cycle the contents of the selected register are shifted by one decimal digit place, that is delayed one digit period, with respect to the other registers.

The register K, due to its ability to act as a delay line, may also be used as a counter according to the method described at page 198 of the book "Arithmetic Operations in Digital Computers," by R. K. Richards, 1955. When its input line 79 and its output line 81 are connected to the output line 41 and to the input line 37 of the Adder 35, respectively while the input line 39 of the Adder 35 receives no signal, the counter counts successive counting pulses which are fed to the carry storing bistable device 49, one each digit period, by the Count Control Circuit 83.

The register K also acts as a buffer memory for temporarily storing a decimal digit, or the address or function part of an instruction, to be printed by printing unit 85.

Finally, the register K functions as a parallel-to-serial converter in the transfer of data or instructions from a keyboard 87 to the store LDR, as described more fully in the aforementioned U.S. Pat. No. 3,304,418.

Instruction Register 89 comprises eight binary stages I1 to I8 which contain the eight bits of the instruction under execution. The Register 89 transfers its contents to the Decoder 91, which has outputs, Y1–Y12; F1.1–F1.14, F2.1–F2.*n*, F3.1–F3.*n*; corresponding to the twelve addressable memory registers and the aforementioned instructions, respectively.

If an instruction of the first format is stored in the Register 89, the inputs to the Decoder 91 from stages I1 to I4 and the input A5 energize one of the address outputs Y1 to Y12. This output selects one of the 12 memory registers or, if the instruction is a jump instruction, specifies one of the jump codes. The inputs I5–I8 cause the Decoder 91 to energize one of the function outputs.

If the instruction is of the second format, only the first character of the instruction is stored in the register 89. If an instruction such as F2.1 (modification of the first instruction of the program) is stored, only one output of the Decoder 91 is energized; if the F2.4 instruction (output of information) is stored, one of the outputs Y1 to Y12, is energized by the bits B1 to B4 to select the memory register containing the data to be output, while the bits B5–B8 energize the output F2.4 of the Decoder 91.

In the case of an instruction of the third format, one of the outputs F3.1–F3.*n* of the Decoder 91, each corresponding to a special instruction, is energized.

The outputs of the stages I1 to I4 and the output lines of the stages I5 to I8 may also be connected, via gates 93 and 95 respectively, to the input lines of the stages K5 to K8 of the register K in order to print out the address and the function stored in said stages.

A switching Network 97 is provided for selectively interconnecting the 10 memory registers, the adder 35, the shift register K, the instruction register 89, the Magnetic Cartridge Register 99 and the input-output devices for controlling the transmission of data and instructions to and from the various parts of the computer. Switching Network 97 may consist of a diode matrix or transistor NOR-circuit matrix or similar switching means having no storage properties. The selection of the memory register designated by the Decoder 91 is also performed by the Switching Network 97.

The keyboard 87 is used for entering data and instructions and for controlling the various functions of the computer. It includes a numeric portion 101 including 10 numeral keys 0 to 9 for entering numbers into the memory register M via the buffer register K; in a preferred embodiment the register M being the only memory register accessible from the numeral keyboard. The keyboard 87 also includes an address portion 103 provided with keys each one controlling the selection of a register of the delay line memory LDR. A function portion 105, includes keys which correspond to the function part of one of the instructions the computer can execute.

In the illustrated embodiment of the invention, the three keyboards 101, 103 and 105 control a mechanical decoder made of code bars cooperating with electrical switches for producing on four lines, H1, H2, H3 and H4, binary signals representing either the four bits of a decimal digit set up on the keyboard 101, the four bits of an address set up on the keyboard 103, or the four bits of a function set up on the keyboard 105. The decoder also energizes one of the output lines G1, G2 or G3 to indicate which of the keyboards 101, 103 or 105, respectively, has been operated.

A decimal point key 109 and a negative algebraic sign key 109, when operated, directly produce a binary signal on the lines SN and V, respectively.

The computer may be selectively preset to operate according to three modes, namely "manual," "automatic" and "entering program" depending on whether a three-position commutator 111 generates a signal PM, PA or IP, respectively. During the program entering operation, the signal keyboard being present, the address keyboard 103 and the function keyboard 105 are operable to enter the instructions into the programs registers via the buffer register K. For this purpose the outputs H1 to H4 of the keyboard decoder may be connected, via gate 113, to the inputs 8 to 11 respectively of the register K. In the meantime, the keyboard 101 is inoperative.

During the automatic operation, in which the program previously entered into the memory LDR is executed, the address keyboard 103 and the function keyboard 105 are inoperative.

The automatic operation of the machine is made up of a sequence of instruction-extract phases and instruction-execute phases. During an extract phase an instruction is extracted from a program register and transferred to the Register 89; this phase is automatically followed by an execution phase, in which the computer executes the stored instruction. This execution phase is automatically followed by an extraction phase for the next instruction, which is the extracted and stored in lieu of the preceding one etc. As long as an instruction is stored in the Register 89, the memory register indicated by the address part of the instruction remains continuously selected, and the Decoder 91 continuously produces the function signal corresponding to the function part of the instruction.

During the automatic operation, the numeric keyboard 101 is also normally inoperative because the computer operates upon the data previously entered into the memory. This keyboard is operable for entering data into the M register only while the stop instruction is stored in the Instruction Register 89. It is apparent that the use of the stop instruction allows much more data to be processed than the computer memory may contain.

During the manual operation the numeric keyboard 101, the address keyboard 103 and the function keyboard 105 are all operative. In this mode of operation the address keyboard 103 and the function keyboard 105 may be used by the operator to cause the computer to perform a sequence of operations similar to any sequence performed during the automatic operation. For this purpose the operator enters via the keyboard 87 an address and a function, which are therefore stored via gates 115 and 117, respectively, in the Register 89 just as in an instruction-extract phase in the automatic operation. Moreover, by entering an instruction (address and function) into the keyboard, an instruction-execution phase is automatically instituted for executing the entered instruction in a manner similar to the execution phase in the automatic operation. Upon completion of said instruction-execution phase the computer stops and waits for a new instruction entered by the operator through the keyboard 87.

As previously mentioned, when no address key is operated the register M is automatically addressed. When entering one of the four fundamental arithmetic operations via the keyboard the operator does not have to operate the address keyboard but instead may enter a number through the numeric keyboard; in this case the selected operation is performed upon the entered number. Therefore during manual operation any arithmetic operation may be performed either upon a number previously entered into the register M via the numeric keyboard 101 or upon a number stored in a memory register selected by means of the address keyboard 103.

During automatic operation the functions specified in the instructions are executed upon data previously entered in the memory. Before starting the automatic program execution, the operator may enter the initial data, by first entering it through the numeric keyboard 101 into the M register and then transferring it to the desired register.

The Condition Registers 119 include a plurality of bistable devices which contain, at any time, information about the instantaneous condition of the machine, which information is used throughout the computer for controlling its operation. The output signals from the Condition Registers 119 are collectively designated by the reference letter A in FIG. 1. The particular configuration and mode of operation of a portion of the bistable devices in the illustrated embodiment of the invention may be similar to that illustrated and described in the above-mentioned U.S. Pat. No. 3,304,418. Certain minor alteration must be made in the designation of some of the signals to conform to the enlarged and redesignated registers of the machine of the present invention but these are well within the capabilities of one skilled in the art.

Besides those bistable devices described in the above-mentioned patent, the Condition Registers 119 of the present invention also includes the bistable devices illustrated in FIG. 5 of the drawings. Bistable devices A11, A12 and A13 are used in the indirect addressing of the magnetic cartridge. Bistable device A5 is used for shifting the significance given to the address portion of an instruction, and bistable device A14 is used in the indirect addressing of memory registers. Bistable device A15 is used during a jump instruction and bistable device A16 is used for the modification of the splitting of registers. A more detailed description of their operation is given later.

Returning to FIG. 1 of the drawings, Sequence Control Unit 121 includes a group of status-indicating bistable devices P1 to P*n*, only one of which is set at any one time. During the operation of the computer it is in the status corresponding to the set bistable device. In its operation the computer goes through a sequence of statuses, and accomplishes predetermined elemental operations during each one.

The particular sequence of said statuses is determined by a logical network 123. On the basis of the present status of the computer, the instruction at present stored in the Register 89, and indicated by the Decoder 91, and the present internal conditions of the computer indicated by the Condition Registers 119, the network 123 determines what status must follow and sets the output 125 which corresponds to said status. Thereafter the Change of Status Timing Circuit 127 produces a change-of-status timing pulse MG, which enables the AND-gates 229 and allows the energized output 125 to set the bistable device P1 to P*n* corresponding to the next status.

A more detailed description of how the computer of the present invention may be used for performing arithmetic operations such as addition, subtraction, multiplication and division may be found in the aforementioned U.S. Pat. No. 3,304,418 and U.S. Pat. No. 3,469,244, which is assigned to the assignee of the present invention and also contains a more detailed description of the operation of portions of the machine of the present invention.

A description of how the machine of the present invention may be programmed with a magnetic card is contained in U.S. Pat. application, Ser. No. 435,828 filed on Mar. 1, 1965, now abandoned and assigned to the assignee of the present invention.

MAGNETIC CARTRIDGE

The Magnetic Cartridge of the present invention, shown in FIG. 6 of the drawings, is an auxiliary data and program memory which very greatly increases the storage capacity and flexibility of the machine.

Its use allows the computer to store and execute much longer programs on greatly increased amounts of data without increasing the size of the internal memory at all. Therefore the operating speed of the computer is not reduced. The storage member of the Cartridge in the illustrated embodiment of the invention is a loop of magnetic tape 131 having seven information tracks and a address track 133. Information is stored on and read from the information tracks in blocks 135, each block 135 having a capacity of four memory registers or 124 digits. Each track contains 40 block locations so that up to 280 blocks of information may be stored in all.

The address track 133 contains 40 addresses numbered O through 39 with addresses 20 through 39 being interlaced among addresses 0 through 19. Each address 137 on the address track 133 identifies a group of seven blocks 135 arranged adjacent to each other, one on each track. Therefore to specify a particular block 135 it is necessary to give both the address track address 137 and the track number. A read-write head 139 is provided for each information-track and for the address track 133.

The Track Selector and Amplifier 141, under the control of the Magnetic Cartridge Controller 143, selects the address track 133 for reading when searching for a particular block 135 (Instruction F2.2) or selects the information track specified in the Cartridge Address Register 99 when transferring information between the cartridge and the memory registers.

The Cartridge Address Register 99 is an eight-bit register which may be made up of flip-flops connected together as a ripple counter. The six least significant bits of the register specify the address track address 137 with the four least significant bits holding the units portion of the address and the other two bits holding the tens portion. The two most significant bits of the register hold the track number for tracks 0 through 3. The bistable device 145 is included for holding the third bit of the track number when tracks 4, 5 or 6 are addressed.

The eight-bit cartridge address is read serially from the memory into the Register 99 over line N through the Switching Network 97 via AND-gates 147 or 149. The bits are inserted into the most significant bit of the Register 99, one each bit period, and are stepped down the register in response to clock pulses over line 151 until all eight bits have been inserted.

The outputs from each of the bits of the Register 99 and from the bistable device 145 are connected to the Address Decoder 153 which decodes them and transmits signals to the Cartridge Controller 143. The Controller 143 then initiates a search for the proper address on the tape 131.

When the first digit of the two digit instruction (F2.2) is read out of the memory and inserted in the Instruction Register 89, the machine switches to phase P27. In this phase the second digit of the instruction is fed serially into the Cartridge Address Register 99 over line N from switching Network 97 via the AND-gate 147. During this phase the clock pulses for stepping the address bits down the register are generated by the AND-gate 155 which is enabled by the signal A3. A3 is one of the outputs of the Condition Registers 119 and is energized during the digit period in which an instruction is extracted from the memory; in this case during the extraction of the second digit of the F2.2 instruction.

Thus the Register 99 receives eight clock pulses, one during each of the M4 times of the eight-bit periods; thereby causing the eight bits of the second digit of the instruction to be inserted into the Register 99. The address is then decoded by the Decoder 153 which feeds the decoded information into the Cartridge Controller 143. The Controller 143 in turn moves the magnetic tape loop 131 past the read-write heads 139 until the proper address track address 137, corresponding to the tens and units bits of the Register 99, is sensed, and then enables the read-write head 139 corresponding to the track number indicated by the Register 99.

The time consumed in searching for the proper address 137 on the tape 131 is often quite large compared to the computing time of the machine. For this reason the programmer should place the search instruction, F2.2, several instructions before the information transfer instruction, F3.6 to F3.11. After inserting the cartridge address into the Cartridge Register 99 the machine may then continue to execute other instructions and by the time it comes to the information transfer instruction, the cartridge address 137 will have been located.

Twelve of the registers of the memory are divided into three zones of four registers each and the transfers between the cartridge and the memory are made on a block-by-block, zone-by-zone basis. If it is desired to record only a portion of a zone into a block, a special "end of record" instruction is placed at the end of the information to be transferred which, when sensed by the cartridge, stops the recording of information on the tape 131.

A finite amount of time is required for the mechanical tape moving mechanism to stop the tape 131 after the proper block address 137 has been sensed by the address track read-write head 139. For instance, if the address of block number 20 is inserted into the Cartridge Register 99, the tape 131 actually comes to a stop with the read-write heads 139 between block addresses 1 and 21. This phenomenon can be called overshoot. Therefore the address in the second digit of the block search instruction must be for the block address 137 one less than that which is to be used. When an information read or write instruction is inserted into the Instruction Register 89 the machine switches to phase P29, the address in the Cartridge Resister 99 is incremented by one by the Cartridge Address Incrementer 157, the tape 131 is started moving, comparison is made between next block address 137 and the address stored in the Cartridge Resister 99 and then the transfer is made via lines N or O.

If more than one block of information is to be transferred, it may be done without the necessity of successive block address search instructions if the programmer arranges the program so that the transfers take place between the memory and successive blocks 135 on the tape 131. Each information transfer instruction increments the block address in the Cartridge Register 99 so that it corresponds to the next address on the tape 131.

The Cartridge Register 99 contains means for propagating binary carries along the bit places of the Register 99 and the bistable device 145. Unless the units digit stored in the register is 9, the Cartridge Address Incrementer 157 increments the cartridge address by adding a binary 1 to the least significant binary bit place of the Register 99. If the Address Decoder 153 indicates that the units digit is 9 the Cartridge Address Incrementer 157 adds a binary 7, or 0111, to the units digits of the Register 99 in order to increment the address.

The address which follows the block No. 39 on one information track is block No. 0 on the next higher information track. Thus a sufficient space must be let on the tape loop 131 between the block No. 39 and block 0 to allow the tape 131 to stop before the read-write heads 139 pass block 0 when the block address search instruction calls for block 39. If block 19 is called for in the block address search instruction the tape 131 stops with the read-write heads 139 positioned between blocks 39 and 0. When the block information transfer instruction increments the address to 20 and starts the tape 131, the next address sensed is address No. 0 so that the comparison in the Magnetic Cartridge Controller 143 fails. The Cartridge Controller 143 therefore keeps the tape moving and prevents the transfer from taking place until address No. 20 is sensed and the comparison shows agreement.

In the illustrated embodiment of the invention only the first four information tracks may be addressed directly by the method described above since only two bits of the Cartridge Register 99 are reserved for the track number. In order to address the other three tracks the bistable device 145 must also be used.

All seven of the information tracks may be addressed by a block search instruction by means of indirect addressing. The use of indirect addressing of the Magnetic Tape Cartridge also further increases the flexibility of the machine. The particular block of data or program transferred between the tape and the main memory may be made dependent on the results of previous operations in the execution of the program, thereby permitting branching both in the program being executed and in the data being processed.

The fact that the cartridge is to be addressed indirectly may be indicated to the machine by any one of several methods. Among these are the use of a special one digit indirect address block search instruction in place of the normal two digit instructions. In the present embodiment of the invention the normal two digit block address search instruction is used with the second digit containing a binary 10, i.e., 1010, in the units digit bits. This second digit is fed into the Cartridge Register 99 in the same way as was described above. The sensing of the 10 in the units digit bits by the Decoder 153 causes output Q to become energized and sets the machine to phase P28. In this phase the bits B5, B6, B7 and B8 of the two least significant digits of the A register are inserted into the Cartridge Register 99 and the bits B5 and B6 of the third digit of the A register are inserted into the Third Digit Decoder 159.

The third digit of the A register may be either 0, 1 or 2. If it is 0 the Decoder 153 produces no output and the address in the Register 99 is correct. This is the case when one of the first four tracks are being addressed. If the third digit is 1 the Decoder 159 adds binary ones in the sixth and eighth bit places of the Register 99. If the third digit is 2 the Decoder 159 adds binary ones in the eighth bit place of the Register 99 and to the bistable device 145. All of this adding is performed with propagation of carries.

The clock pulses for the Register 99 during indirect addressing are supplied through AND-gate 161 as is explained in more detail later.

To explain the operation of the machine during the indirect addressing of the cartridge we refer now to FIGS. 5 and 6 of the drawings. The energizing of output Q of the Decoder 153 causes the bistable device All to be set through the AND-gate 163 on the next LBIR; that is at the beginning of the next memory cycle as the first bit of the first digit of the memory registers is starting to be available on the Converter 19 (FIG. 1).

At the end (T8, M16) of the first digit time C1, the fact that A11 is set, sets bistable device A12 through the AND-gate 165. A12 is reset at M1 of time T8 of the second digit time C2 through AND-gate 166. The trailing edge of the set output of A12 sets bistable device A13 through the triggering circuit 167 which produces an output upon the occurrence of the trailing edge of the input. The triggering circuit 167 may for instance be made up of a capacitive circuit and diodes.

At the beginning of the third digit period, C3, T1 resets A11 through the AND-gate 169 since A13 is now set. A13 is reset at the end of the third digit period by the trailing edge of T8 through the triggering circuit 171 and the AND-gate 173 since A11 is reset.

The setting of the machine in phase P28 causes the Switching Network 97 to connect the A Register to the input line N of the Cartridge Register 99. Since A11 is set during the first two digit times, the AND-gate 149 is enabled during these digit periods. Only the last four bits, B5, B6, B7 and B8, of the first two digits are clocked in, by the pulse M4 however, since the AND-gate 161 is enabled only during T5 through T8.

The AND-gate 173 is enabled by the presence of A11 and A13 during the third digit period for inserting the third digit into the decoder 159. Only the bits B5 and B8 are clocked in by pulses M4 through the AND-gate 175 since it is enabled only during these times by T5 and T6. As discussed above, B5 and B6 of the third digit may take on a value of either 0, 1 or 2.

JUMP INSTRUCTIONS

As discussed briefly in regard to its instruction repertoire, the machine is capable of executing three types of jump instructions. The first is a simple jump to a specified reference instruction in the program. This jump may be unconditional or may be conditional on the contents of the A Register. The mechanism of this type of jump instruction is described in more detail in the above-mentioned U.S. Pat. application, Ser. No. 701,193, filed Jan. 29, 1968 and assigned to the assignee of the present invention. This application is a continuation of application Ser. No. 435,877 which was filed on Mar. 1, 1965, now abandoned.

The second type of jump is that discussed in regard to instructions F2.1 and F3.1. In executing this type of jump a first simple jump instruction to a first reference instruction is inserted in the first instruction location in the P1 Register. Next a simple jump is executed to a subroutine which is preceded by a second reference instruction. The subroutine is ended with a jump to the first instruction location in the P1 Register. Since this location has itself been filled with a jump instruction this jump to the first reference instruction is also executed and the main program is resumed. The first reference instruction must be placed after the instruction for jumping to the subroutine. A more complete explanation of the mechanization of this type of jump instruction may be found in U.S. application, No. 717,110 filed Mar. 29, 1968 now abandoned and assigned to the assignee of the present invention.

The types of jump instructions described above and used in the cited prior art machines allow for a very flexible programming, but certain difficulties still existed, especially with nested subroutines. In a situation involving nested subroutines, one subroutine may itself include jumps to and returns from selected ones of other subroutines. This greatly increases the flexibility of programming, but was relatively difficult to accomplish with the types of jump instructions described above.

The machine of the present invention solves this difficulty by including means for executing a third type of jump instruction; a jump with retention of the starting point instruction. The jump is initiated with an instruction of the third type, F3.14 to **F3.*n***. There are a plurality of these jump instructions each one corresponding to a different reference instruction. Thus several jump instructions of this type may be used in a single program without danger of the machine confusing them.

One of the special features of the jump with retention of the starting point instruction is that, when the machine executes the jump, it also converts the jump instruction into the corresponding reference instruction.

The subroutine to which the machine jumps must begin and end with the corresponding reference instruction. The machine, upon finishing the execution of the subroutine, reads the second reference instruction and, by means to be described below, interprets this second reference instruction as the corresponding jump instruction. Thus the machine jumps once again, this time back to the converted original jump instruction where it again begins the execution of the main program. Upon arriving back at the converted jump instruction, the machine also reconverts it into a jump instruction.

It is necessary in the illustrated embodiment of the invention that the subroutine be placed after the main body of the program and, if there are "nested" subroutines, that a subroutine containing a jump to a second subroutine be placed in the memory before the second subroutine.

A jump with retention of the starting point instruction differs from the corresponding reference instruction only in the first bit, B1, of the instruction. For the jump instruction B1 is a binary "0" while for the reference instruction bit B1 is a binary "1." Other than this the corresponding jump and reference instructions are identical.

The insertion, during an extraction phase, of a jump with retention of the starting point instruction into the Instruction Register 89 causes the machine to switch to phase P29 and sets bistable device A15 (FIG. 5). In phase P29 the machine scans the memory registers, starting with the beginning of the register in which the jump instruction is stored, searching for the corresponding reference instruction. The bit BIB indicates the instruction presently stored in the instruction Register 89 and is therefore in the digit place of the B Register 89 and is therefore in the digit place of the B Register corresponding to the location of the jump instruction in the program register being searched. During the search for the corresponding reference instruction the Tag Bit Control Circuit 33 transfers the bit BIB to the corresponding place in the program register being searched, thereby converting the jump instruction stored in that digit place to the corresponding reference instruction.

Referring now to FIG. 7 of the drawings, the scanning of the program registers in search of the corresponding reference instruction is accomplished by comparing the bits B2 through B8 of the digits of the program registers with the corresponding bits of the jump instruction stored in the Instruction Register 89 in a bit-by-bit fashion in the Comparator 175. Bit B1 of the instructions is also fed into the Comparator 175 but is sensed to determine if it is a binary "1" rather than being compared to bit B1 of the Instruction Register 89 since, as explained above, bit B1 of a reference instruction must be a binary "1."

When the Comparator 175 senses coincidence, i.e., upon finding the corresponding reference instruction, it generates an output T which sets the machine to the instruction extraction phase P17 and causes Tag Bit Control Circuit 33 (FIG. 1) to record a tag bit B1B1 in the next digit place of Register B. The execution of the subroutine then begins with the extraction of the first instruction which is stored in the digit place following the reference instruction.

At the end of the execution of the subroutine the reference instruction which finishes the subroutine is extracted and stored in the Instruction Register 89. The Decoder 91 decodes this instruction and energizes an output F'3.14 to F'3.*n*. The machine treats this instruction much like the corresponding jump instruction and switches to phase P29.

In this case, however, the search for the corresponding reference instruction starts at the first digit place of memory register P1 rather than at the beginning of the register in which the reference instruction which initiated the jump accurred.

The energizing of one of the outputs F'3.14 to F'3.*n* also sets the bistable device A15 which causes the Tag Bit Control Circuit 33 to block the regeneration of the bits B1B in order to erase the BIB=1 stored at the digit corresponding to the reference at the end of the subroutine.

The search for the reference instruction is once again performed by means of the comparator 175 in the same manner as before. When it finds the reference it again generates the output signal T which resets bistable device A15 and causes Tag Bit control circuit 33 to write a bit B1B=1 in the next digit place of the Register B. The fact that the bistable device A15 is set when the comparator 175 generates the output T causes the Adder 35 to be connected with the K Register as a counter in the manner previously described and to count 31 digit places, starting with the digit following the reference instruction sensed by the comparator 175. When the counter reaches 31 the reference instruction is once again read from the Delay Line LDR and the counter produces an output which causes the Tag Bit Control Circuit 33 to block the regeneration of the bit B1 of the reference instruction thereby reconverting it to the corresponding jump instruction. The machine now resumes the execution of the main program and extracts the instruction following the reconverted jump instruction.

This type of jump instruction may clearly be used for the execution of nested subroutines. The jump from a first subroutine to a second, located after the first in the memory, and the return to the first subroutine may be accomplished in the manner described above without affecting the machine's ability to jump back to an earlier subroutine or to the main program.

INPUT-OUTPUT

The machine of the present invention is also capable of transmitting information to or accepting information from external devices such as card or tape units, teleprinters, or a large-scale data processing system. In this way the machine may exchange information with other media or even act as a terminal unit for a large-scale computer.

The two digit instructions F2.3 and F2.4, previously described, are used to input or output, respectively, up to one memory register of information from or to a selected external device. When the first digit of the input instruction F2.3 is inserted into the Instruction Register 89 during the execution of a program it causes the machine to switch to phase P31. The first four bits of the second digit, B1 through B4, are inserted into the Input-Output Controller 177, shown in FIG. 8, over line N and the second four bits which, if not zero, indicate the maximum number of digits to be accepted, are inserted into the K Register. If the second four bits are all zero, up to 31 digits of information may be accepted.

The first bit, B1, of the second digit indicates whether the information to be input is numerical or alphabetical. The next two digits, B2 and B3, select the particular input, and the fourth bit, B4, may be used for a control bit, for example, to tell a tape reader to rewind to the previous stop and start transmitting the information again if a parity check failed.

The Input-Output Controller 177 decodes the bits of the instruction and selects the particular device being addressed. The machine then switches to phase P32 and the information from the selected device is inserted into the M Register. The K Register is connected with the Adder 35 as a counter during this phase and counts the digits as they are received. If more than the desired maximum number of digits is received the counter gives an output signal and an error indication is given.

If desired, the information may be transferred from the M Register to another portion of the memory by a subsequent instruction.

The output instruction works in a manner similar to the input instruction. The first digit of the instruction contains the address of the register to be output in the first four bits, B1 through B4, and the function code in the second four bits, B5 through B8. When the first digit is inserted into the Instruction Register 89 and the address and F2.4 outputs of the Decoder are energized, the machine switches to phase P31, the first four bits of the second digit are inserted into the Controller 177 and the second four bits are inserted into the Controller 177 and the second four bits are inserted into the K Register.

The first three bits of the second digit have the same significance as in the input instruction. The fourth bit, B4, indicates whether the real or absolute value of the information is to be output.

The Controller 177 decodes the bits and selects the particular device being addressed by the instruction. The machine then switches to phase P33 and the information from the selected memory register is transmitted to the selected device. Again the K Register keeps a count of the number of digits and gives an error indication if the memory register contains more than the selected maximum number of digits.

INDIRECT ADDRESSING OF REGISTERS

The memory registers in the illustrated embodiment of the invention may be addressed either directly, as described above, or indirectly.

The provision of indirect addressing greatly increases the capability of the machine. The particular data to be operated upon by an instruction, or the reference instruction to be jumped to in the case of a jump instruction, can be made dependent upon the results of previous operations in the execution of the program. Thus a branching capability is provided both in the program and in the data being processed. In the indirect addressing of the memory registers, the address portion of the first format instruction or output instruction contains the address of the memory register whose least significant two digit places contain the address of the register to be operated upon by the instruction.

The 10 registers P3, P4, C, D, E, F, C', D', E' and F' may be addressed indirectly. Also, any one of the fourths of these registers may be addressed; i.e., the fields in the registers beginning with the first, eighth, 16th, and 24th bit places. Therefore there are a total of 40 memory locations which may be addressed indirectly.

Each memory register and its split portion is characterized by a four-bit address contained in bits B1 through B4 of the instruction. In the illustrated embodiment of the invention the address of the split portion of the register differs from that of the register itself only in the least significant bit, B1, which is 0 for the register address and 1 for the split portion.

In order to indicate that an instruction is to be interpreted as containing indirect addresses it is necessary to precede the instruction with the third format instruction F3.4. The instruction F3.4 sets the bistable device A14 which, after the next instruction is extracted, causes the machine to switch to phase P34 at the start of the next memory cycle.

In phase P34 the bits B5 through B8 of the two least significant digits of the memory register addressed by the instruction currently stored in the Instruction Register 89 (FIG. 1) are fed into the Indirect Address Decoder 179 through AND-gate 181 (FIG. 9). 9). The least significant digit contains the address code to be modified according to table I and inserted into the address portion of the Instruction Register 89 through AND-gate 183. The second digit causes the Decoder 179 to selectively set the bistable devices A5 and A16 (FIG. 5) for shifting the significance of the register addresses and modifying the split of the registers, respectively.

The two least significant digits of the memory register selected by the indirect address may contain a number between 0 and 39. This number is decoded and modified by the Indirect Address Decoder 179 according to the following table:

TABLE I

| Number in selected register: Decimal | Binary | | Instruction register address | A5 | A16 | Register addresses |
|---|---|---|---|---|---|---|
| 0 | 0000 | 0000 | 1000 | No | No | C |
| 1 | 0000 | 0001 | 1001 | No | No | C/ |
| 2 | 0000 | 0010 | 1010 | No | No | D |
| 3 | 0000 | 0011 | 1011 | No | No | D/ |
| 4 | 0000 | 0100 | 1100 | No | No | E |
| 5 | 0000 | 0101 | 1101 | No | No | E/ |
| 6 | 0000 | 0110 | 1110 | No | No | F |
| 7 | 0000 | 0111 | 1111 | No | No | F/ |
| 8 | 0000 | 1000 | 0100 | No | No | P3 |
| 9 | 0000 | 1001 | 0101 | No | No | P4 |
| 10 | 0001 | 0000 | 1000 | Yes | No | C′ |
| 11 | 0001 | 0001 | 1001 | Yes | No | C′ |
| . | . | . | . | . | . | . |
| . | . | . | . | . | . | . |
| 17 | 0001 | 0111 | 1111 | Yes | No | F′/ |
| 18 | 0001 | 1000 | 0100 | Yes | No | P3 |
| 19 | 0001 | 1001 | 0101 | Yes | No | P4 |
| 20 | 0010 | 0000 | 1000 | No | Yes | C |
| 21 | 0010 | 0001 | 1001 | No | Yes | C/ |
| . | . | . | . | . | . | . |
| . | . | . | . | . | . | . |
| 27 | 0010 | 0111 | 1111 | No | Yes | F/ |
| 28 | 0010 | 1000 | 0100 | No | No | P3 |
| 29 | 0010 | 1001 | 0101 | No | No | P4 |
| 30 | 0011 | 0000 | 1000 | Yes | Yes | C′ |
| 31 | 0011 | 0001 | 1001 | Yes | Yes | C′/ |
| . | . | . | . | . | . | . |
| . | . | . | . | . | . | . |
| 37 | 0011 | 0111 | 1111 | Yes | Yes | F′/ |
| 38 | 0011 | 1000 | 0100 | Yes | Yes | P3 |
| 39 | 0011 | 1001 | 0101 | Yes | Yes | P4 |

The Decoder 179 may, for instance, include a 96 microsecond (i.e., one and one-half digit length) tapped delay line or a *n* equivalent shift register. When the bits of the units digit of the selected register are fed into the Decoder 179, it senses the most significant bit and if it is a binary 0 the Decoder 179 sets it to a binary 1. If the most significant bit is a binary 1, the Decoder 179 sets it to a binary 0 and sets the B3 bit to a binary 1.

The bits B5 and B6 of the second digit are used for setting the bistable devices A5 and A16 over lines U and W respectively for shifting the significance of the address inserted into the Instruction Register 89 and modifying the split of the registers. When the addresses of the program registers P3 or P4 are inserted into the Instruction Register 89 the bistable devices A5 and A16 determine which portion of the register is addressed.

The bits from the two least significant digits of the selected register are fed into the Decoder 179 during the T5 through T8 bit times whereas the bits of the Address must be fed into the Instruction Register 89 during the T1 through T4 bit times. For this reason the Decoder 179 must delay the bits by an odd number of half digit periods.

If the delay is at least 3 half digit periods the first bit out of the Decoder 179 over line V may also be used to reset the bistable device A14. This causes the machine to switch, at the beginning of the next memory cycle, to the phase required to begin the execution of the operation designated by the function bits in the Instruction Register 89.

After the execution of the instruction the instruction F3.5 is used to reset the bistable devices A5 and A16 if they have been set by the indirect address.

We claim:

1. In an electronic computing arrangement for executing at least one main program and at least one subprogram with the main program including at least one jump instruction and with the subprogram beginning with a reference instruction, the location of the reference instruction defining the object of the jump instruction, the combination comprising:

a. a memory containing the main program and the subprogram;

b. an instruction executor;

c. means for indicating the instruction currently under execution, the indicating means being connected between the memory and the executor; and d. an instruction converter responsive to the indicating means, for interconverting jump and reference instructions 1. the converter operative to convert the jump instruction to a converted reference instruction in response to the jump instruction being indicated by the indicating means;

2. the converter further being operative to reconvert the converted reference instruction to a reconverted jump instruction in response to the final instruction of the subprogram being indicated by the indicating means.

2. The arrangement of claim 1 wherein the jump and reconverted jump instructions are identical and wherein the reference and converted reference instructions are identical.

3. The arrangement of claim 2 wherein the jump and reference instructions differ by at least a single tag bit and wherein the instruction converter is a tag bit control circuit which interconverts jump and reference instructions by altering the tag bits of these instructions.

4. In an electronic computing arrangement for executing a portion of a main program, jumping to and executing a subprogram, and jumping back to and executing a second portion of a main program, comprising:

a. a memory for containing the main and subprograms with the first portion of the main program terminating with, and the second portion commencing with, a jump instruction, and with the subprogram commencing with a reference instruction which corresponds to the jump instruction in that the corresponding reference and jump instructions have sections of identical bit arrangement;

b. an instruction register, connected to the memory, for indicating the instruction to be executed;

c. a program executor, connected to the register, for executing the instruction currently indicated in the register;

1. the executor including a comparator means for comparing sections of the bit arrangement of reference instructions with a section of a jump instruction located in the instruction register to determine the reference instruction which corresponds to the jump instruction in the register;

2. the executor further including means for jumping to the location of a corresponding reference instruction in response to the comparator's determination of a corresponding reference instruction; and d. an instruction converter, responsive to the instruction register, for interconverting jump and reference instructions;

1. the converter responsive to the indication of the jump instruction in the register to convert the jump to a converted reference instruction;
2. the converter responsive to the indication by the instruction register of the final instruction of the subprogram for reconverting the converted reference to a reconverted jump instruction.

5. In an electronic digital computer an addressing arrangement comprising:

a memory containing at least one indirect addressing instruction, which instruction includes the address of a memory location, said memory location containing a coded address;

an instruction register for containing the instruction currently under execution;

means for placing said indirect addressing instruction into said instruction register;

an indirect address decoder for translating said coded address into the decoded address of a region of said memory;

an executing means, responsive to the placing of said indirect addressing instruction into said instruction register, for inserting said coded address into said decoder;

means responsive to said decoder, for replacing the address included in the indirect addressing instruction which is in the instruction register with the decoded address produced by said decoder.

6. The addressing arrangement according to claim 5 wherein said executing means includes means, responsive to said indirect address decoder, for identifying portions of said region identified by said decoded address.

7. In an electronic digital computing system having executing and control circuitry adapted to execute instructions, a memory arrangement comprising:

a. a first memory means for storing data and instructions, said first memory including a plurality of zones of a given storage capacity;
b. a second memory means for storing data and instructions, said second memory being a loop of magnetic tape having at least one address track and having a plurality of information tracks which correspond to said address track, each of said information tracks having the same predetermined number of information block locations and said address track having said same predetermined number of block identification addresses with each block address identifying a single block location on each information track, each of said block locations having a storage capacity which equals that of each of said memory zones;
c. a magnetic read/write unit disposed adjacent to said magnetic tape and connected to said first memory;
d. addressing means operatively connected between said first memory and said read/write unit for enabling said unit to transfer information between said block locations and said zones, said addressing means including an address register, said register including a first partial register means for identifying one of said block identification addresses on said address track, said register further including a second partial register means for identifying one of said information tracks.

8. In the system according to claim 7 wherein said addressing means includes a tape drive means for moving said tape loop past said read/write unit in accordance with a block address stored in said first partial register and wherein said addressing means further includes an overshoot correction means, connected to said first partial register, for altering the block address in said first partial register to correct for said tape drive overshooting the block address stored in said first partial register.

9. In a system according to claim 8 wherein said address track has recorded thereon at least a first and a second block address, said second block address being physically separated from said first block address by a distance which is at least equal to the amount of overshoot in said tape drive, and wherein said overshoot correction means includes an incrementing means, said second block address being addressed by entering the address of said first block address into said first partial register causing said tape drive to move said tape so that said first block address passes said read/write unit, said incrementing means being then operative to increment the first partial register so that said first partial register contains the address of said second block address.

10. In the arrangement according to claim 7 wherein said block locations are identified by block identification addresses which are interlaced so that if the addresses are numbered from 0 to $n$, the addresses numbered $(n/2 + 1\frac{1}{2})$ to $n$ are interlaced with the addresses numbered 0 to $(n/2 + \frac{1}{2})$, where "(Y)" indicates the greatest integer contained in the number (Y).

11. The computer according to claim 7 wherein said addressing means includes an indicator for indicating that said second memory is being addressed indirectly and further includes means, responsive to said indicator, for transferring an address from a predetermined portion of memory to said address register.

* * * * *